Aug. 20, 1940.  S. PILE  2,211,790
FLEXIBLE POWER TRANSMISSION MEMBER
Filed July 26, 1938
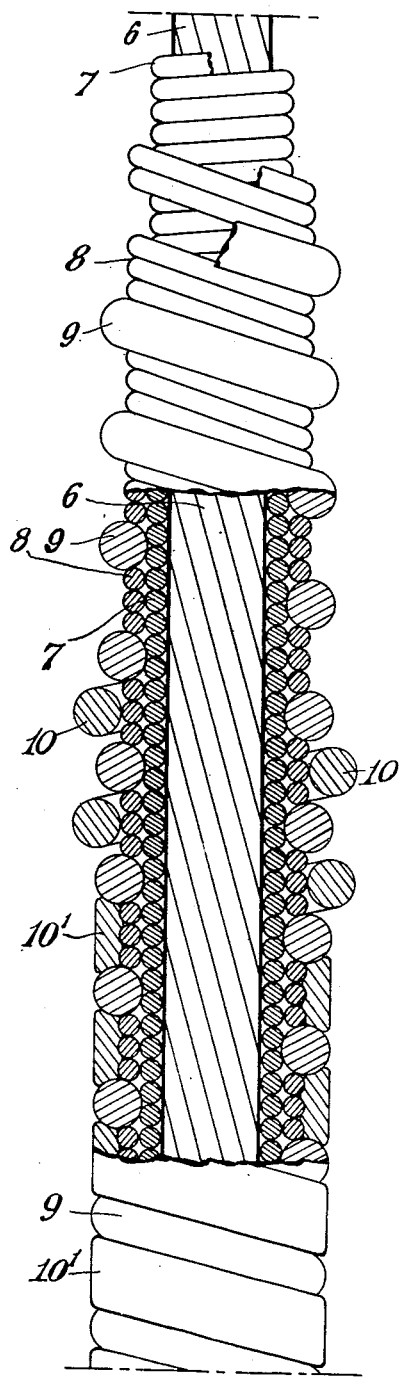
Inventor
Sydney Pile
By Blair & Kilsoyne
Attorneys.

Patented Aug. 20, 1940

2,211,790

UNITED STATES PATENT OFFICE 2,211,790

FLEXIBLE POWER TRANSMISSION MEMBER

Sydney Pile, London, England, assignor to M. R. C. Limited, London, England, a British company Application July 26, 1938, Serial No. 221,456
In Great Britain July 2, 1938

3 Claims. (Cl. 74—501)

This invention relates to flexible members for the transmission of power both by push and pull and which include projecting spaced annular members on the exterior, and has for its principal object to improve the efficiency of such members.

These flexible members (for example cables) as hitherto constructed have a portion, generally a core, for the pulling (or tension) operations surrounded by members, for example single or multiple start closely wound helices, for the pushing (or compression) operations and suitably spaced members which project on the exterior (such for example as a helix of heavier gauge wire) not only to assist in the transmission of the compression, but also to provide means for inter-engagement with transmitting members or to participate in transmission to the parts to be operated.

It has been found in practice that a disadvantage arising from such transmission members is the fact of the friction set up between the contacting portions of the exterior surface of the projecting spaced annular members thereof with the guiding casing therefor. In this connection it should be realised that (in-so-far as the transmission of push for the compression action is concerned) although the friction due to the pull or tension actions is present, it readily can be overcome, whereas the friction due to the push or compression action presents much greater difficulties.

This arises not only from the fact that the resistance to movement has to be overcome by the power (push or compression) which can be transmitted through the member, but also by the further fact that this push or thrust acting round necessary bends in the guiding casing makes itself felt on the larger radius of said bends (as contrasted with the smaller diameter for tension efforts).

The general result of the above is that for the transmission of pushes or compression, a greatly excessive effort is necessary, but moreover owing to the exigencies of manufacture of the transmission member and the guiding casing in which it is mounted, the necessary clearances give rise to excessive backlash.

In other words, in the employment of such members for transmitting both push and pull, difficulties exist for close precision movements owing to the backlash which must be taken into consideration.

A primary object of the present invention, therefore, is to decrease or minimise the friction of the exterior of the push and pull transmitting member (i. e. the cable) on the interior of the guiding casing and, secondarily, so to construct the transmitting member that the practical tolerance of its outermost exterior diameter can be reduced, thereby enabling the necessary clearance between it and its guiding casing to be reduced. This last-mentioned factor, as will be realised, minimises the lag or backlash when the transmitting member is assembled in its guiding casing. This last factor is still further minimised as owing to the fact that the exterior diameter of the push and pull transmitting member can be made with greater precision, it is possible more precisely to form the internal diameter of the guiding casing to conform therewith. In this way both the more precisely formed transmitting member and the casing through which it works contribute to the precision of devices constructed according to the invention.

As will be realised, flexible transmitting members for push and pull of the type to which the invention relates as hitherto constructed must be built up from materials that resist wear. Generally, when built from wire this is of steel or other hard metal, for example rustless steel, phosphor bronze or otherwise. Further, upon the completion of the laying of the wires, the member has an adequate heat treatment to maintain the necessary hardness and prevent unravelling when the member is cut into requisite lengths.

In general, according to the principal feature of the present invention, the exterior of push and pull members for the transmission of power has, between the projecting spaced annular members, an outer coating or thickness of anti-friction metal or material of a softer nature than the spaced annular members or the layer or layers which transmit the compression. This outer coating is preferably made up from annularly arranged members and may, for example, be formed helical with a single or multiple start, the section of the material thereof being as desired. It preferably further abuts the projecting spaced annular members.

According to a still further feature of the invention the said outer coating of anti-friction metal or material may, after being disposed on the exterior of the member, be swaged in position, preferably by rotary swaging, to cause it both to conform as far as possible to the surface on which it is laid and to give it a highly precise outer diameter.

As an additional feature of the invention, the relative dimensions of the parts and the degree of swaging can be such that the exterior of the softer anti-friction metal or material is brought to the outermost exterior diameter of the spaced annular projections.

A still further feature of the invention is concerned with a process for the manufacture of members and consists in the fact that the softer metal is laid on the partly manufactured member as it emerges from the heat-treating and tempering stages, this to be followed as a continuous process by the swaging (preferably rotary swaging) operation to complete push and pull transmission members in accordance with the invention.

As will be realised, a great variety of metals or materials can be utilised, such as softer antifriction metals, and in cases where desirable such materials as aluminium, white metals, coppers, brasses, bronzes or any mixture thereof. The choice obviously will depend upon the material from which the normal push and pull member is made. For example, where this is of hardened tempered steel, it might even be that the softer material utilised could be a mild steel of less hardness which readily could be swaged. In most cases, however, a material softer than mild steel would be utilised.

In order that the invention may be better understood, it will now be described with reference to the accompanying greatly enlarged and somewhat diagrammatic drawing which is given by way of example and the single figure of which shows a power-transmitting push and pull cable with spaced annular projections, and with the invention applied thereto.

Referring to the drawing, 6 is the inner core made up from helically disposed steel wires of great pitch so as to render the core practically inextensible, and is for the transmission of pull or tension.

The compression-transmitting part is comprised by a single-start helical layer 7 having wound thereon and of the opposite hand, a multi-start helical covering 8 of a certain diameter wire with a single-start helical wire 9 of larger diameter coming therebetween so that the helix 9 forms spaced annular projections.

The member thus far described is known and works through a guiding casing and the projections 9 can be and are utilised for engagement with toothed or other members.

In accordance with the present invention, in the spaces between the projecting annular members 9 is laid a wire 10 of softer metal or material. This might be of such a character that when so laid, it contacted with the adjacent turns of the helix 9 and had its outer surface to come at the same diameter as that of the outer surfaces of the turns 9. In other words it would be of flattened rectangular section.

However, it is preferred to utilise the circular or other section wire 10 and to swage it (preferably by rotary swaging) into position, such for example as shown at 10', where it will be seen from the drawing it is given a substantially cylindrical surface of the same outermost exterior diameter as that of the turns 9 whilst its inner surface is brought into conformation with the multi-start layer 8.

In utilising a member such as shown in the drawing it will be realised it can slide through the guiding casing with much less friction, especially at bends, than would be the case were the wire 10' not present.

To maintain the structural advantages of the spaced annular projections 9, however, for example for gearing purposes, it is simply necessary to remove the softer wire 10' from the positions on the member where the said member has to enter into geared relation with a gear-wheel or otherwise. This is easy as the said wire 10' readily can be cut and removed by hand, In manufacturing members such as shown it will be realised that already-existing members can be taken and have the additional helix of softer wire applied thereto, and then swaged.

According to one feature of the invention it is preferred, however, that the member made up from hardened steel wires, for example the core 6, cover 7 and wires 8 and 9, as it emerges from the heat-treating and tempering stage of manufacture should have the wire 10 as the case may be laid thereon and then passed direct through a rotary swaging machine which by the multiplicity of radial blows during the traverse of the member, effects the swaging to bring the parts into the position shown towards the lower parts of the figure.

In practice the guiding tubular casing for push and pull power-transmitting members to pass through, in the sizes dealt with can rarely be obtained with an interior diameter having a tolerance less than some three-thousandths of an inch. As, also, such normal transmission members have about the same tolerance in manufacture, the member generally fits the casing with a substantial degree of clearance.

This, as will be readily seen, over long and for example straight runs, results in the undulation of the member when transmitting push. Consequently there is appreciable backlash, rendering such power-transmission members inefficient for transmitting fine adjustments.

With the great precision, however, that can be given to the exterior diameter of members constructed according to the invention by the rotary swaging, and by the further fact that slightly over-size tubular casing can, in accordance with another feature of the present invention, also be subjected to rotary swaging upon a standard mandrel, it is possible to bring the interior diameter of the casing extremely close to that of the outer diameter of the member. This results in minimum slackness and a minimum backlash, still further to increase the efficiency, especially for the transmission of fine adjustments.

What I claim and desire to secure by Letters Patent of the United States of America is:

1. In a flexible cable for the transmission of power both by push and pull of the type comprising a comparatively inextensible core portion for the main transmission of pull formed by a plurality of metal wires having on the exterior thereof a comparatively incompressible outer covering for the transmission of push formed by a plurality of closely wound helical wires with the turns in contact, said latter plurality including a wire the helix of which projects on the exterior beyond the other helices to constitute spaced-apart turns, said construction including the provision between the said spaced-apart turns, a helix of wire softer than those forming the said outer covering and having the same finished exterior diameter as that of the projecting helix.

2. A flexible cable for the transmission of power both by push and pull as claimed in claim 1, in which the helix of softer wire is swaged into position between the turns of the projecting helix.

3. A flexible cable for the transmission of power both by push and pull as claimed in claim 1, in which the helix of softer wire is swaged into position between the turns of the projecting helix to contact with the turns of the projecting helix.

SYDNEY PILE.